United States Patent
Ohtsuka

[11] Patent Number: 5,680,886
[45] Date of Patent: Oct. 28, 1997

[54] IMPACT ENERGY ABSORBER

[75] Inventor: Kunio Ohtsuka, Tokyo, Japan

[73] Assignee: Ohtsuka Co., Ltd., Tokyo, Japan

[21] Appl. No.: 703,697

[22] Filed: Aug. 27, 1996

[30] Foreign Application Priority Data

Jul. 15, 1996 [JP] Japan ................. 8-184643

[51] Int. Cl.$^6$ .............................................. F16F 7/12
[52] U.S. Cl. ................... 138/121; 138/122; 138/129; 138/134; 296/187
[58] Field of Search ................... 138/121, 122, 138/137, 129, 132–134, 177, 178; 296/146.7, 35.2, 189

[56] References Cited

U.S. PATENT DOCUMENTS

| 2,897,603 | 8/1959 | Behrman | 138/121 X |
|---|---|---|---|
| 3,881,767 | 5/1975 | Klees | 296/35.2 |
| 4,413,856 | 11/1983 | McMahan et al. | 296/189 X |
| 4,793,384 | 12/1988 | Lalikos et al. | 138/121 |
| 4,890,877 | 1/1990 | Ashtiani-Zarandi et al. | 296/146.7 |
| 5,033,593 | 7/1991 | Kazuhito | 296/189 X |
| 5,040,646 | 8/1991 | Drefahl | 296/189 X |
| 5,102,163 | 4/1992 | Ishikawa | 296/146.7 X |
| 5,325,893 | 7/1994 | Takagi et al. | 138/173 X |
| 5,345,721 | 9/1994 | Stein et al. | 296/146.7 X |
| 5,431,445 | 7/1995 | Wheatley | 296/189 X |
| 5,456,513 | 10/1995 | Schmidt | 296/39.1 |

*Primary Examiner*—Patrick Brinson
*Attorney, Agent, or Firm*—Jacobson, Price, Holman & Stern, PLLC

[57] ABSTRACT

An object of the present invention is to efficiently absorb the energy of an external force applied to a vehicle body without an appreciable increase in weight of an automobile. To achieve the object, the present invention provides an impact energy absorber made of a composite in which kraft paper is placed on the outside and inside of a metal sheet such as iron foil or hard aluminum foil. The impact energy absorber is a flexible pipe having a substantially quadrangular cross section and provided with spiral-shaped concaves and convexes on the outside and inside of hard aluminum foil. The energy absorber is bonded to the room-side surface of an outer panel of the vehicle body using an adhesive. When an external force is applied to the energy absorber, the energy absorber can absorb the energy of the external force by being deformed plastically.

3 Claims, 5 Drawing Sheets

IMPACT ENERGY ABSORBER

FIELD OF THE INVENTION AND RELATED ART STATEMENT

The present invention relates to an impact energy absorber for absorbing the energy of an external force applied to an automotive body.

To ensure the safety of an automobile, a body panel such as an outer panel and inner panel has so far been reinforced. To reinforce the body panel, the thickness of the panel is increased. When the thickness of the panel is increased, however, the weight of a vehicle body increases accordingly. As a result, the manufacturing cost as well as the material cost increases, and the fuel consumption becomes high when the automobile is run. Therefore, in designing the body panel, consideration is made to fully increase the strength of the panel by considering the curvature, thickness, etc. of the panel.

OBJECT AND SUMMARY OF THE INVENTION

Sometimes, however, it is difficult to make such a design because the automotive body requires a different shape and thickness according to the vehicle type, or the body cannot be reinforced by an inner panel because automotive accessories are disposed therein. Therefore, even if an attempt is made to strengthen the body while achieving the lightening of the same, it is difficult to strengthen all portions, and any reinforcement member required. Also, there is a case where it is desired to further strengthen the body by a simple method while suppressing the increase in weight even if the body has been strengthened fully in designing.

On the other hand, when an external force over a certain value is applied to the automotive body, the body panel undergoes plastic deformation. In such a case, if an absorber is provided to absorb the energy of the external force, the burden of the occupants of the automobile and the damage to other components due to the external force can be alleviated.

The present invention was made to solve the above problems, and an object thereof is to provide an impact energy absorber which can absorb the energy of an external force applied to a body without an appreciable increase in weight of an automobile.

To achieve the above object, the invention provides an impact energy absorber which is a flexible pipe having a substantially quadrangular cross section arranged between outer and inner panels of an automotive body with the pipe surfaces facing the panel surfaces to absorb the energy of an external force by plastic deformation when an external force is applied to the pipe.

Also the invention provides an impact energy absorber which is a flexible pipe having a substantially quadrangular cross section, made of a composite in which kraft paper is placed on the outside and inside of hard aluminum foil, and provided with spiral-shaped concaves and convexes on the outside and inside of hard aluminum foil, the pipe being arranged between outer and inner panels of an automotive body and fixed using an adhesive or fastening member with the pipe surfaces facing the panel surfaces to absorb the energy of an external force by plastic deformation when an external force is applied to the pipe.

DETAILED DESCRIPTION OF PREFERRED EMBODIMENTS

An impact energy absorber in accordance with an embodiment of the present invention will be described with reference to the drawings.

Figure 1:
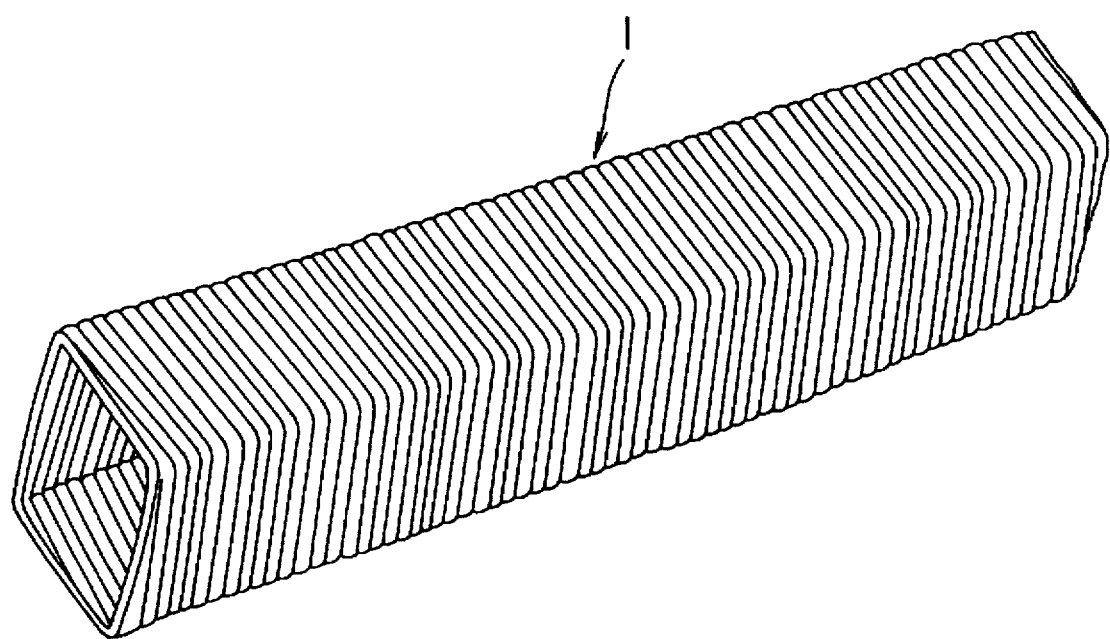
FIG. 1 is a perspective view of an impact energy absorber in accordance with an embodiment of the present invention.
Figure 2:
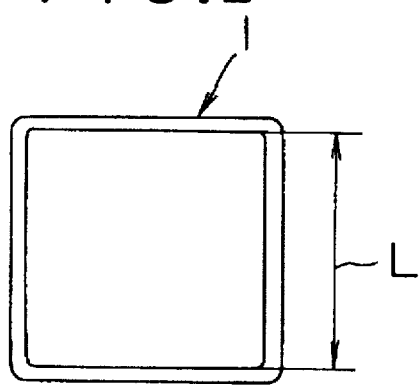
FIG. 2 is a front view of the impact energy absorber shown in FIG. 1.
Figure 3:
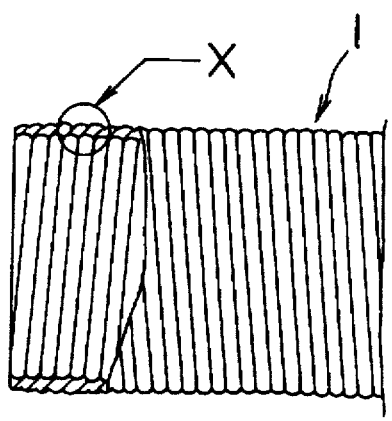
FIG. 3 is a partially cutaway side view of the impact energy absorber shown in FIG. 1.

FIGS. 1 to 3 show an impact energy absorber 1 in accordance with the present invention. This energy absorber 1 is a flexible pipe having a quadrangular cross section. If the cross section is substantially quadrangular, any shape such as square or rectangle may be used. In this embodiment, a square shape is used as shown in FIG. 2. Various pipe cross-sectional size may be used according to the application.

Figure 4:
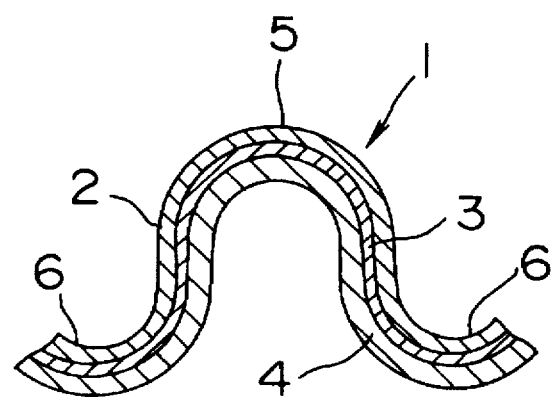
FIG. 4 is an enlarged sectional view of the encircled X portion in FIG. 3.

FIG. 4 is an enlarged view of the encircled X portion of the energy absorber 1 shown in FIG. 3. As shown in the figure, the surface of the energy absorber 1 is formed by a three-layer composite consisting of an outside layer material 2, an intermediate layer material 3, and an inside layer material 4 in that order from the outside. Of these materials, the outside and inside layer materials 2 and 4 are kraft paper, and the intermediate layer material 3 is a metal sheet such as iron foil or hard aluminum foil. These layer materials 2 to 4 form concaves 5 and convexes 6 in a wave form continuously in the axial direction. These concaves 5 and convexes 6 are formed in a spiral form. Table 1 gives the details of a preferred shape of the energy absorber 1.

TABLE 1

| Inside Layer Material | | | Intermediate Layer Material | | | Outside Layer Material | | |
| --- | --- | --- | --- | --- | --- | --- | --- | --- |
| Material | Thickness (mm) | Width (mm) | Material | Thickness (mm) | Width (mm) | Material | Thickness (mm) | Width (mm) |
| Kraft Paper | 0.2 and over | 30 and over | Aluminum Iron | 0.05 and over | 30 and over | Kraft Paper | 0.2 and over | 30 and over |

Next, the characteristics of the impact energy absorber 1 are described.

Figure 5A:
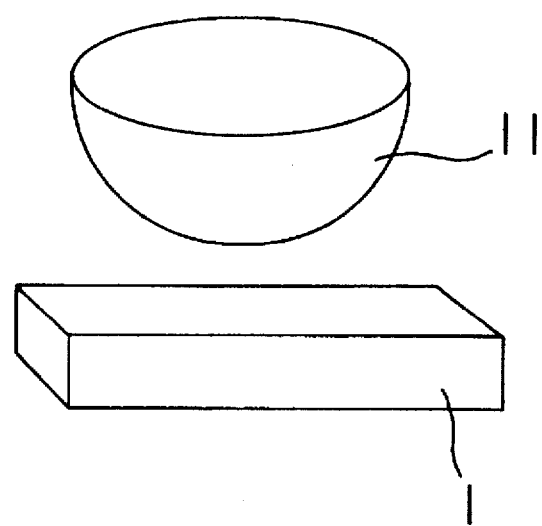
FIG. 5A is a schematic view showing a characteristic test for the impact energy absorber in accordance with the embodiment of the present invention.
Figure 5B:
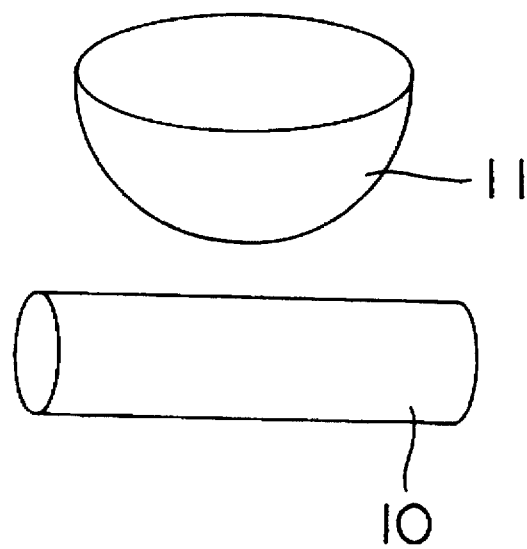
FIG. 5B is a schematic view showing a characteristic test for the impact energy absorber in accordance with a comparative example.

FIG. 5A shows the impact energy absorber 1 having a square cross section of this embodiment, and FIG. 5B shows an impact energy absorber 10 having a circular cross section used as a comparative example. The circular energy absorber 10 is a flexible pipe having a completely round cross section, whose outside diameter is equal to the outside width of one side of the square energy absorber 1, and whose length in the axial direction, thicknesses of layer materials, pitch and number of turns of spiral form are also equal to those of the square energy absorber 1.

Figure 6:
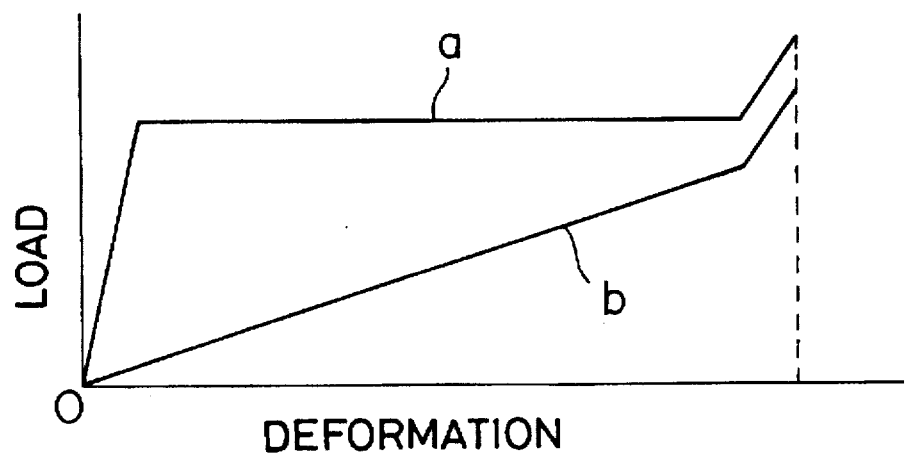
FIG. 6 is a schematic graph showing the characteristic test result for the impact energy absorber.

These energy absorbers 1 and 10 were compressed by the tip end of a hemisphere 11 with a diameter of 165 mm by using a compression tester, and the inside length L in FIG. 2 was measured. The compression speed was 100 mm/min. The test result is shown in FIG. 6. In the figure, the solid line a indicates the test result for the square energy absorber 1, and the solid line b indicates that for the circular energy absorber 10. As shown in the figure, the square energy absorber 1 is deformed less under a high load at the initial stage than the circular energy absorber 10, absorbing energy from an external force at the initial stage of deformation. When a load over a certain value is applied, the deformation increases suddenly. On the other hand, the circular energy absorber 10 exhibits a linear relationship such that deformation is proportional to load.

Table 2 shows the details of the shapes of energy absorbers of two different types. The above-described test was performed on these energy absorbers, with the result that the load of type 1 when being completely compressed (the inside length L becomes 0) was about 220 kgf, while that of type 2 was 460 kgf.

TABLE 2

| Type | Outside width (mm) | Shape | Component | | | Number of Turns/ Per 100 mm Length | Weight(g)/ Per 100 mm Length |
| --- | --- | --- | --- | --- | --- | --- | --- |
| | | | Kraft Paper | Hard Aluminum | Kraft Paper | | |
| 1 | 20 | Square | t0.2 × W60 | t0.09 × W35 | t0.2 × W60 | 52 | 11.03 |
| 2 | 26 | Square | t0.2 × W60 | t0.1 × W35 × 2 | t0.2 × W60 | 52 | 23.49 |

Note: t and w denote thickness and width, respectively. (unit: mm)

With regard to the strength of the impact energy absorber 1, the deformation under load can be changed by rounding the corner. The larger the radius of roundness is, the larger the deformation under load is. Further, the strength can be adjusted by changing the thickness of material, width, and pitch of convexes.

Figure 7:
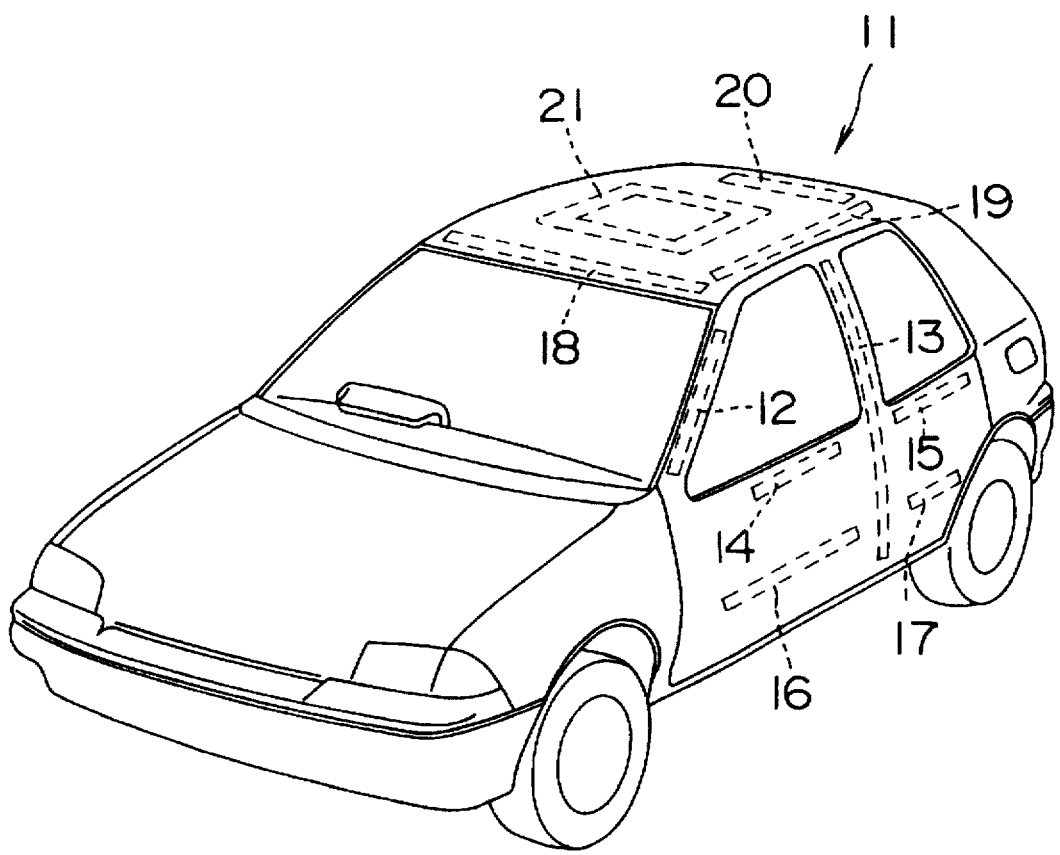
FIG. 7 is a perspective view of an automobile on which locations where the impact energy absorbers in accordance with an embodiment of the present invention are arranged are shown.

The energy absorber 1 absorbs the energy of an external force applied to the body of an automobile. The arrangement locations of the energy absorbers 1 include, as shown in FIG. 7, a front pillar 12, center pillar 13, shoulder portions 14 and 15 of front and rear doors, lower portions 16 and 17, front roof rail 18, side roof rail 19, and rear header rail 20 of an automobile 11. When a sliding roof is attached, the energy absorber can be arranged around the sliding roof 21.

Figure 8:
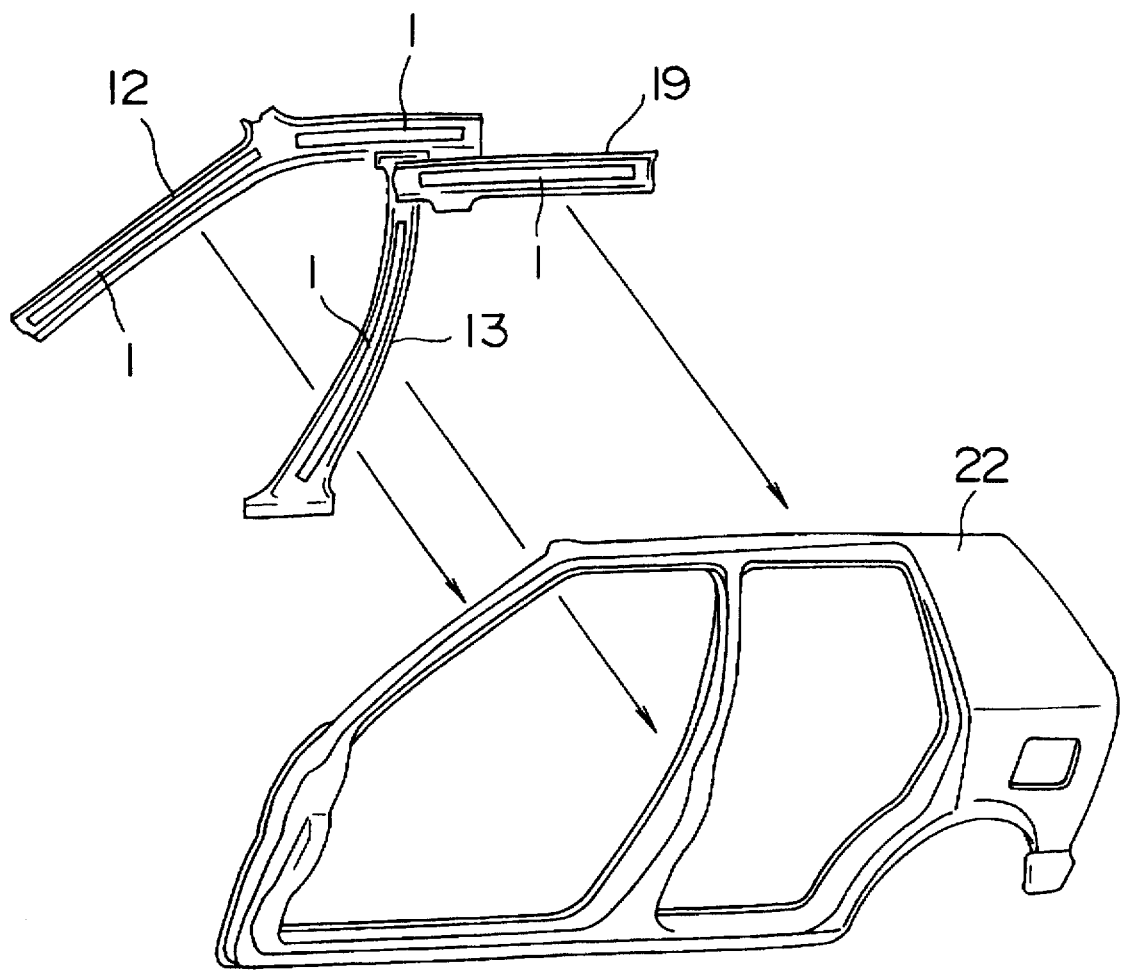
FIG. 8 is an exploded perspective view of a side body of the automobile.

FIG. 8 shows a state in which the energy absorbers 1 are actually attached to the front pillar rail 12, center pillar rail 13, and side roof rail 19, which are inside panels. The energy absorber 1 can easily be bonded directly to the panel using an adhesive because it is square in cross section. Also, the energy absorber 1 can be attached even if the arrangement location is somewhat curved because of its flexibility. After the energy absorbers 1 are bonded to the rails 12, 13 and 19, they are arranged at the locations by fixing the rails to a side body panel 22, which is an outer panel, by welding.

The energy absorber 1 of this embodiment in accordance with the present invention absorbs the energy of an external force applied to the body of the automobile 11 by being deformed, so that it can alleviate the burden and shock imparted to other portions. In particular, it can alleviate shock by a slight deformation even under a high initial load as compared with the energy absorber with a circular cross section.

Also, the energy absorber 1 has versatility such that it can be attached easily and can be attached to a somewhat curved location, and its attaching workability is high. As shown in Table 1, its weight is light, so that it does not increase the weight of vehicle body so much.

Although one embodiment of the present invention has been described above, needless to say, the present invention is not limited to this embodiment. Various modifications may be made based on the technical concept of the present invention.

For example, according to the above-described embodiment, the energy absorbers 1 are arranged at the locations shown in FIG. 7, but the arrangement locations of the energy absorbers 1 are not limited to the aforementioned locations. For example, the energy absorber 1 may be arranged on an apron side panel, front panel, etc. of an engine room with similar effects.

Also, the concaves and convexes 5 and 6 are formed into a spiral form to make the energy absorber 1 flexible. Alternatively, the concaves and convexes may be arranged in an annular form to give flexibility to the energy absorber 1.

The energy absorbers 1 are attached to the inner panel side such as rails 12, 13 and 19. Alternatively, they may be attached to the outer panel side of the body panel 22. Also, the energy absorber 1 is bonded using an adhesive. Alternatively, the energy absorber 1 may be attached to the panel by installing clips on the absorber, or may be attached using a clip band.

As described above, according to the present invention, the energy absorber can absorb the energy of an external force applied to the body without an appreciable increase in the vehicle body weight, and can alleviate the burden of occupants and damage to other components caused by the external force.

I claim:

1. An impact energy absorber comprising a flexible pipe made of hard aluminum foil, having a substantially quadrangular cross section, and provided with substantially sequential spiral-shaped concavities and convexes about its entire periphery along its length, said pipe being arranged in a space between an outer panel of an automotive body forming an automotive outer surface and an inner panel of the automotive body and being fixed to the outer panel of the automotive body, and a surface of the flexible pipe being adhered to said inner and outer panel surfaces using a fastening member so as to absorb energy of an external force by plastic deformation of said flexible pipe when an external force is applied to said flexible pipe.

2. An impact energy absorber comprising a flexible pipe made of a composite of kraft paper placed outside and inside of hard aluminum foil, having a substantially quadrangular cross section, and provided with substantially sequential spiral-shaped concavities and convexes about its entire periphery along its length, said pipe being arranged in a space between outer and inner panels forming a pillar portion of an automobile, a surface of the flexible pipe facing along a longitudinal direction of the pillar in the direction of said outer and inner panel surfaces being fixed thereto using a fastening member so as to absorb energy of an external force by plastic deformation of said flexible pipe when an external force is applied to said flexible pipe.

3. An impact energy absorber according to claim 2, wherein corners of said flexible pipe are rounded.

* * * * *